(12) United States Patent
Song et al.

(10) Patent No.: US 11,807,773 B2
(45) Date of Patent: Nov. 7, 2023

(54) MULTI-PHASE STRUCTURED UV-CURABLE POWDER COATING RESIN AND PREPARATION METHOD THEREOF

(71) Applicants: FOSHAN YIKEJU NEW MATERIAL CO., LTD., Guangdong (CN); JIANGSU RAP RESIN TECHNOLOGY CO., LTD., Jiangsu (CN)

(72) Inventors: Jirui Song, Guangdong (CN); Ming Wu, Guangdong (CN)

(73) Assignees: FOSHAN YIKEJU NEW MATERIAL CO., LTD., Foshan (CN); JIANGSU RAP RESIN TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 17/912,519

(22) PCT Filed: Mar. 31, 2021

(86) PCT No.: PCT/CN2021/084740
§ 371 (c)(1),
(2) Date: Sep. 18, 2022

(87) PCT Pub. No.: WO2022/048148
PCT Pub. Date: Mar. 10, 2022

(65) Prior Publication Data
US 2023/0136069 A1 May 4, 2023

(30) Foreign Application Priority Data
Sep. 7, 2020 (CN) .......................... 202010925779.3

(51) Int. Cl.
- *C09D 175/16* (2006.01)
- *C09D 5/03* (2006.01)
- *C09D 167/06* (2006.01)

(52) U.S. Cl.
CPC ........... *C09D 175/16* (2013.01); *C09D 5/033* (2013.01); *C09D 167/06* (2013.01); *C08L 2205/025* (2013.01); *C08L 2205/03* (2013.01)

(58) Field of Classification Search
CPC .... C09D 175/16; C09D 5/033; C09D 167/06; C09D 5/03; C09D 175/14; C09D 163/10;
(Continued)

(56) References Cited

U.S. PATENT DOCUMENTS

2022/0195138 A1* 6/2022 Lofftus .................... C09D 5/30

FOREIGN PATENT DOCUMENTS

| CN | 1270605 A | 10/2000 |
| CN | 105669962 A | 6/2016 |

(Continued)

OTHER PUBLICATIONS

_Liling Wei et al., Synthesis of resin for UV curing acrylic powder coatings, Paint & Coatings Industry, Nov. 2004, pp. 23-26, vol. 34, No. 11.
(Continued)

*Primary Examiner* — Sanza L. McClendon

(57) ABSTRACT

The present invention provides a multi-phase structured UV-curable powder coating resin and a preparation method thereof, comprising (1) obtaining an emulsion of a liquid UV resin by heating the liquid UV resin and an emulsifier, dispersing, and adding deionized water for emulsification; (2) melting and dispersing a solid UV resin, a phase change agent, an emulsifier, and deionized water; adding the emulsion of the liquid UV resin with stirring to thoroughly mix; temperature is lowered during the stirring to obtain a sus-
(Continued)

pension; (3) press filtering the suspension of the UV-curable powder coating resin to obtain a filter cake; (4) drying and classifying the filter cake to obtain the multi-phase structured UV-curable powder coating resin. The multi-phase structured UV-curable powder coating resin is prepared from the aforementioned method. The present disclosure has the properties of both the liquid and solid UV resin and can be sprayed as a powder coating.

14 Claims, 2 Drawing Sheets

(58) Field of Classification Search
CPC ........... C08L 2205/025; C08L 2205/03; C08F 299/065; C08G 18/6715; C08G 18/73; C08G 2150/20; C08J 2367/06; C08J 2375/14; C08J 2467/06; C08J 3/126
See application file for complete search history.

(56) References Cited

FOREIGN PATENT DOCUMENTS

| | | |
|---|---|---|
| CN | 108659684 A | 10/2018 |
| EP | 1359173 A1 | 11/2003 |
| EP | 1408095 A1 | 4/2004 |
| WO | WO-2014191300 A1 * 12/2014 | ............ C08J 3/126 |

OTHER PUBLICATIONS

1st Office Action of counterpart Chinese Patent Application No. 202010925779.3 dated Nov. 2, 2020.
Notice of Allowance of counterpart Chinese Patent Application No. 202010925779.3 dated Nov. 12, 2020.

* cited by examiner

MULTI-PHASE STRUCTURED UV-CURABLE POWDER COATING RESIN AND PREPARATION METHOD THEREOF

FIELD OF THE INVENTION

The disclosure relates to the field of powder coatings, in particular to a multi-phase structured UV-curable powder coating resin and a preparation method thereof.

BACKGROUND OF THE INVENTION

Social and economic developments bring improvements in living standards and increased health awareness. Considering the requirements of environmental protection regulations, higher expectations are placed on the development of coatings, and the application of traditional coatings is facing more restrictions. Great performance, high efficiency, environmentally friendly, and good decorative performances are key development goals for modern coatings.

UV-curable resin is a photosensitive resin with a relatively low molecular weight. It comprises functional groups that can cure under UV light, such as various unsaturated double bonds. In the final light-cured product, UV-curable resin is the main component, and its properties decide the main properties of the cured product. Therefore, UV-curable resin is critical to the design of UV light-curable products.

Most of the UV-curable resins are liquid UV resins. The production of liquid UV resins involves a small amount of diluting solvent. Some resins will be lost throughout the manufacturing process, resulting in higher production costs and negative environmental impact. On the other hand, for powder coatings made from solid UV resins, the leveling properties, mechanical properties, and chemical resistance of their film coatings are not entirely satisfactory, and hence their use is limited.

SUMMARY OF THE INVENTION

The objective of the present disclosure is to provide a multi-phase structured UV-curable powder coating resin and a preparation method thereof. The powder coating resin has the properties of both liquid UV resin and powder coating resin. It can be sprayed as a powder coating and thus the resin can be used in a wide range of applications. Furthermore, it is environmentally friendly.

To achieve the objective above, the present disclosure provides a method for preparing a multi-phase structured UV-curable powder coating resin, comprising:
(1) obtaining an emulsion of a liquid UV resin by heating the liquid UV resin and an emulsifier, dispersing and adding deionized water for emulsification;
(2) melting and dispersing a solid UV resin, a phase change agent, an emulsifier, and the deionized water until fully molten and homogeneously dispersed; adding the emulsion of the liquid UV resin with stirring to thoroughly mix; temperature is lowered during the stirring to obtain a suspension of the multi-phase structured UV-curable powder coating resin;
(3) press filtering the suspension of the UV-curable powder coating resin to obtain a filter cake;
(4) drying and classifying the filter cake to obtain the multi-phase structured UV-curable powder coating resin.

As an improvement to the technical solution above, in step (1), the liquid UV resin and the emulsifier are heated at 50-70° C.; after the liquid UV resin and the emulsifier are completely transparent, they are added to a dispersing cylinder and dispersed with a high-speed disperser at a dispersion speed of 600-900 rpm; the deionized water is slowly added for emulsification to generate the emulsion of the liquid UV resin, wherein the emulsification lasts for 20-40 min, and a particle size of the emulsion of the liquid UV resin is controlled between 0.8-1.5 μm.

As an improvement to the technical solution above, 50-70 wt % of the liquid UV resin, 3-10 wt % of the emulsifier, and 25-45 wt % of the deionized water are used.

As an improvement to the technical solution above, in step (2), the phase change agent is solid paraffin having a melting point of 40-95° C.

As an improvement to the technical solution above, step (2) comprising:
adding the solid UV resin, the phase change agent, the emulsifier, and the deionized water into a dispersion tank for stirring and dispersing at a dispersion speed of 200-400 rpm;
melting and dispersing the solid UV resin, the phase change agent, the emulsifier, and the deionized water for a dispersion time of 10-30 min after raising a temperature to 80-100° C.;
adding the emulsion of the liquid UV resin with stirring and dispersing under heating after adjusting the dispersion speed to 600-900 rpm; adding a photoinitiator and continuing to disperse for 20-40 min after the temperature reaches 80-100° C.;
lowering the temperature to 30-40° C. during the stirring.

As an improvement to the technical solution above, 50-60 wt % of the solid UV resin, 5-15 wt % of the phase change agent, 1-5 wt % of the emulsifier, and 30-43 wt % of the deionized water are used.

As an improvement to the technical solution above, the liquid UV resin is at least one selected from the group consisting of polyurethane acrylate, epoxy acrylate, and polyester acrylate;
the solid UV resin is a crystalline unsaturated polyester resin.

As an improvement to the technical solution above, the solid UV resin is an unsaturated polyester resin obtained by reacting with a crystalline vinyl ether oligomer.

As an improvement to the technical solution above, in step (3), the suspension of the UV-curable powder coating resin is filtered with a plate and frame filter to obtain the filter cake and a filtrate, wherein the filtrate is collected for recycling.

As an improvement to the technical solution above, in step (4), the filter cake is transported to a fluidized bed dryer, wherein compressed air of the fluidized bed dryer is controlled at 25-90° C.; powder obtained after drying is classified with a cyclone to obtain the multi-phase structured UV-curable powder coating resin having a particle size of 1.2-3.0 μm.

The present disclosure also discloses a multi-phase structured UV-curable powder coating resin, comprising:
a liquid UV resin, the liquid UV resin is pre-emulsified;
a solid UV resin coated on an outer surface of the liquid UV resin;
the liquid UV resin and the solid UV resin form a shell-core structure through phase transition achieved by melting, dispersing, cooling, and coating.

As an improvement to the technical solution above, the liquid UV resin is at least one selected from the group consisting of polyurethane acrylate, epoxy acrylate, and polyester acrylate;

the solid UV resin is a crystalline unsaturated polyester resin.

As an improvement to the technical solution above, the solid UV resin is an unsaturated polyester resin obtained by reacting with a crystalline vinyl ether oligomer.

As an improvement to the technical solution above, pre-emulsification of the liquid UV resin comprises:

heating the liquid UV resin and the emulsifier at 50-70° C.; adding the liquid UV resin and the emulsifier to a dispersing cylinder after they are completely transparent; dispersing with a high-speed disperser at a dispersion speed of 600-900 rpm; slowly adding deionized water for emulsification to obtain an emulsion of the liquid UV resin, wherein the emulsification lasts for 20-40 min, and a particle size of the emulsion of the liquid UV resin is controlled at 0.8-1.5 μm.

As an improvement to the technical solution above, 50-70 wt % of the liquid UV resin, 3-10 wt % of the emulsifier, and 25-45 wt % of the deionized water are used.

As an improvement to the technical solution above, a process of forming the shell-core structure through phase transition achieved by melting, dispersing, cooling and coating, comprising:

adding the solid UV resin, a phase change agent, an emulsifier, and deionized water into a dispersion tank for stirring and dispersing at a dispersion speed of 200-400 rpm;

melting and dispersing the solid UV resin, the phase change agent, the emulsifier, and the deionized water for a dispersion time of 10-30 min after raising the temperature to 80-100° C.;

adding an emulsion of the liquid UV resin under heating with stirring and dispersing after adjusting the dispersion speed to 600-900 rpm; adding a photoinitiator and continuing to disperse for 20-40 min;

Lowering the temperature to 30-40° C. during the stirring.

As an improvement to the technical solution above, 50-60 wt % of the solid UV resin, 5-15 wt % of the phase change agent, 1-5 wt % of the emulsifier, and 30-43 wt % of the deionized water are used;

The phase change agent is solid paraffin with a melting point of 40-95° C.

The beneficial effects of implementing the present application are as follows:

In the present disclosure, the raw materials are liquid UV resin, solid UV resin, emulsifier, phase change agent, and water. The liquid UV resin is emulsified in the water phase, and the solid UV resin is molten in the water phase, resulting in a multi-phase structured UV-curable resin suspension when applied in combination with phase transformation technology. Filtering, drying, and classifying are then used to create the multi-phase structured UV-curable powder coating resin.

The multi-phase structured UV-curable powder coating resin contains both liquid UV resin and solid UV resin. It has the properties of both liquid UV resin and solid UV resin. It can be sprayed as powder coating. As a result, the resin can be used in a wide range of applications. Furthermore, the system does not contain any diluting solvent and therefore is environmentally friendly. The UV-curable powder coating resin of this disclosure can be cured by UV at low temperatures. It possesses good impact and chemical resistance, as well as the ability to produce transparent/opaque coatings with exceptional properties on the substrate's surface. It is suitable for applying on heat-sensitive substrates such as solid wood furniture and rigid plastics. It has a wide range of applications.

DETAILED DESCRIPTION OF THE ILLUSTRATED EMBODIMENTS

To more clearly illustrate the objectives, technical solutions, and beneficial effects of the present disclosure, the present disclosure is further described in detail below with reference to the accompanying drawings.

The present disclosure relates to a technique that combines the emulsification of liquid UV resin with liquid-solid phase transition. The liquid UV resin is the core; through phase transition, melting, cooling, and coating, the surface of the liquid UV resin is coated with at least one layer of solid UV resin. This is followed by filtering, drying, and classifying to produce a multi-phase structured UV-curable powder coating resin.

Figure 1:
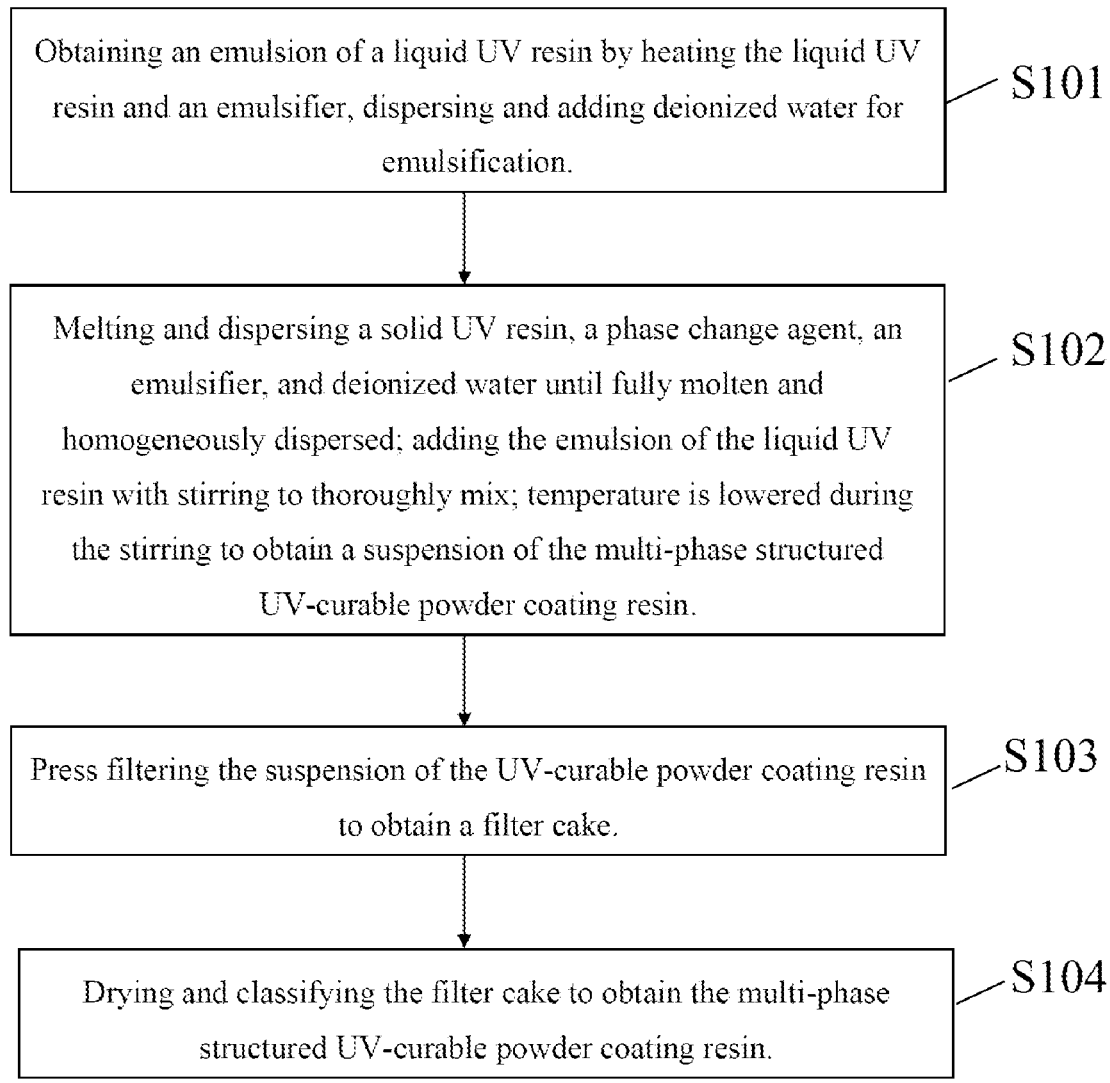
FIG. 1 is a flow chart of the method for preparing the multi-phase structured UV-curable powder coating resin of the present disclosure.

Specifically, as shown in FIG. 1, the present disclosure provides a method for preparing the multi-phase structured UV-curable powder coating resin, comprising:

S101, obtaining an emulsion of a liquid UV resin by heating the liquid UV resin and an emulsifier, followed by dispersing and adding deionized water for emulsification.

Preferably, the liquid UV resin and the emulsifier are heated at 50-70° C.; after the liquid UV resin and the emulsifier are completely transparent, they are added to a dispersing cylinder and dispersed with a high-speed disperser at a dispersion speed of 600-900 rpm; the deionized water is slowly added for emulsification to generate the emulsion of the liquid UV resin, wherein the emulsification lasts for 20-40 min, and the particle size of the emulsion of the liquid UV resin is controlled between 0.8-1.5 μm.

More preferably, the liquid UV resin and the emulsifier are heated at 60-70° C.; after the liquid UV resin and the emulsifier are completely transparent, they are added to a dispersing cylinder and dispersed with a high-speed disperser at a dispersion speed of 800-900 rpm; the deionized water is slowly added for emulsification to generate the emulsion of the liquid UV resin, wherein the emulsification lasts for 30-40 min, and the particle size of the emulsion of the liquid UV resin is controlled between 0.8-1.2 μm.

The liquid UV resin is at least one selected from the group consisting of polyurethane acrylate, epoxy acrylate, and polyester acrylate.

A polyurethane acrylate (PUA) contains acrylic functional groups and urethane bonds. The cured adhesive has polyurethane's superior wear resistance, strong adhesion, high flexibility, high peel strength, and good cold resistance, as well as polyacrylate's good optical qualities and high weather resistance.

The esterification process between an epoxy resin and acrylic acid or methacrylic acid produces epoxy acrylate. Epoxy acrylate resin can be quickly cured by UV light, and the cured coating film is tough, glossy, corrosion-resistant, heat-resistant, and has outstanding electrochemical performance. The raw materials for synthesizing epoxy acrylate are readily available, affordable, and the synthesis process is straightforward.

Polyester acrylate is produced by reacting acrylic acid with polyol or polyester. Ether bonds make up the backbone of polyester acrylate. Polyester acrylates oligomers, in contrast to urethane acrylates and epoxy acrylates, tend to form a low-viscosity liquid oligomer.

Different types of emulsifiers can be used as long as the emulsifier allows the liquid UV resin to produce a stable emulsion. Preferably, the emulsifier is Tween T-80, but not limited thereto.

In this step, 50%-70% of the liquid UV resin, 3%-10% of the emulsifier, and 25%-45% of the deionized water are used. More preferably, 55%-65% of the liquid UV resin, 3%-8% of the emulsifier, and 30%-40% of the deionized water are used. Most preferably, 60% of the liquid UV resin, 5% of the emulsifier, and 35% of the deionized water are used. The percentage sign in this paragraph refers to weight percentage.

In the present disclosure, the liquid UV resin is first emulsified in the water phase to produce an emulsion of the liquid UV resin. Oil-in-water particles are formed in the emulsion. The particle size of the UV resin becomes smaller (0.8-1.5 μm) and is uniformly distributed in the emulsion. After phase transition and solid UV resin coating, particles with a shell-core structure and a uniformly distributed, small particle size (1.2-3.0 μm) are produced. These particles facilitate spraying and leveling in subsequent phases, resulting in a pleasing decorative appearance.

S102, melting and dispersing a solid UV resin, a phase change agent, an emulsifier, and deionized water until fully molten and homogeneously dispersed; adding the emulsion of the liquid UV resin with stirring to thoroughly mix; temperature is lowered during the stirring to obtain a suspension of the multi-phase structured UV-curable powder coating resin.

Preferably, step S102 comprising:
Adding the solid UV resin, the phase change agent, the emulsifier, and the deionized water into a dispersion tank for stirring and dispersing at a dispersion speed of 200-400 rpm;
Melting and dispersing the solid UV resin, the phase change agent, the emulsifier, and the deionized water for a dispersion time of 10-30 min after raising the temperature to 80-100° C.;
Adding the emulsion of the liquid UV resin with stirring and dispersing under heating after adjusting the dispersion speed to 600-900 rpm; adding a photoinitiator and continuing to disperse for 20-40 min after the temperature reaches 80-100° C.;
Lowering the temperature to 30-40° C. during the stirring.

More preferably, step S102 comprising:
adding the solid UV resin, the phase change agent, the emulsifier, and the deionized water into a dispersion tank for stirring and dispersing at a dispersion speed of 300-400 rpm;
melting and dispersing the solid UV resin, the phase change agent, the emulsifier, and the deionized water for a dispersion time of 10-30 min after raising the temperature to 85-95° C.;
adding the emulsion of the liquid UV resin with stirring and dispersing under heating after adjusting the dispersion speed to 600-900 rpm; adding a photoinitiator and continuing to disperse for 20-40 min after the temperature reaches 80-100° C.;
lowering the temperature during the stirring while maintaining the dispersion speed until the temperature reaches 30-40° C.

Step S102 is preferably carried out in a dispersion tank with both a hot water system and a cold water system; the details are described below:

The solid UV resin, the phase change agent, the emulsifier, and the deionized water are introduced into the dispersion tank and dispersed with a high-speed disperser at a speed of 300-400 rpm;

Meanwhile, hot water at 95-100° C. is introduced into the jacket of the dispersion cylinder. When the system temperature reaches 85-95° C., the solid UV resin and phase change agent are entirely molten, and they are emulsified and dispersed with the emulsifier and deionized water for 10-30 minutes.

The dispersion speed of the high-speed disperser is set to 600-900 rpm, and hot water at 95-100° C. is continuously provided. During dispersion and stirring, the emulsion of the liquid UV resin is introduced. The photoinitiator is added after the temperature reaches 80-100° C., and dispersion is continued for 20-40 minutes.

The hot water system is turned off and the dispersion tank is switched to the cold water system. The system begins to cool when setting the cold water temperature to 20° C. The stirring and dispersion speed is held at 900 rpm until the system temperature is reduced to 30-40° C.

In general, polyester resins can be divided into two categories: saturated polyester resins and unsaturated polyester resins. Saturated polyester resins do not have non-aromatic unsaturated bonds, whereas unsaturated polyester resins contain non-aromatic unsaturated bonds. The solid UV resin of the present disclosure is a crystalline unsaturated polyester resin. Preferably, the solid UV resin of the present disclosure is an unsaturated polyester made by reacting with crystalline vinyl ether oligomers.

Specifically, the aforementioned unsaturated polyester is a crystalline vinyl ether oligomer with the following structure:

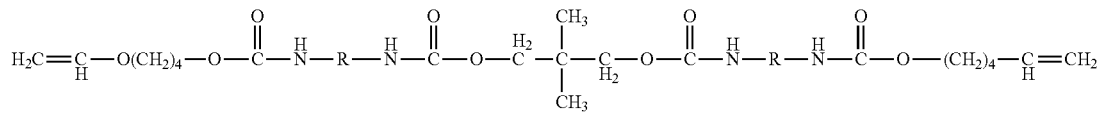

The unsaturated polyester is prepared by polycondensation of fumaric acid, terephthalic acid, and 1,6-hexanediol. The steps of the polycondensation reaction can be designed according to conventional protocol in the art. The polycondensation reaction is carried out at 150-200° C., −0.098-−0.095 MPa for 80-120 min.

It should be noted that the unsaturated bond in the unsaturated polyester is from the carbon-carbon double bond of maleate or fumarate. The unsaturated bond is an electron-deficient double bond that can form a charge transfer compound (CTC) with an electron-rich double bond from vinyl ethers, and undergoes free radical polymerization when exposed to UV light. Vinyl ethers generally refer to oligomers having urethane structure, such as the product of the reaction between hydroxybutyl vinyl ether (HBVE) and hexamethylene

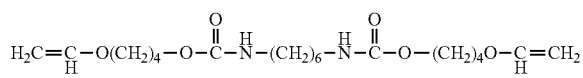

diisocyanate (HDI):

As a result of the polarity of the urethane structure and the long hydrocarbon segment, this vinyl ether oligomer has good crystallinity and is suitable for UV light curing. The crystalline unsaturated polyester resin of the present disclosure has very low viscosity while molten, can rapidly crystallize at temperatures below the melting point, and does not homopolymerize under controlled conditions. The coating obtained after curing with ultraviolet irradiation is of higher quality than conventional UV light-cured powder coatings: it has great adhesion and is corrosion and impact resistant. It also has better leveling and storage properties.

It should be noted that the solid UV resin of the present disclosure may also be epoxy acrylate or urethane acrylate, as long as it contains acrylate.

In step S101, the liquid UV resin is emulsified in the water phase. In step S102, the solid UV resin is melted in the water phase. There are oil-in-water particles of the liquid UV resin and liquefied solid UV resin in the system. The solid UV resin is a crystalline resin, the resin will crystallize once the temperature drops below the melting point during the cooling process. Liquid UV resin particles in the system will function as nuclei, causing the solid UV resin to crystalize. A shell-core structure, in which the solid UV resin is coated on the surface of the liquid UV resin, will be generated, resulting in a multi-phase structured product.

The phase change agent is solid paraffin having a melting point of 40-95° C. Paraffin wax is a kind of mineral wax, its main component is C18-C30 straight-chain alkanes. Other components include isoparaffins, intracyclic alkanes, and a minor quantity of aromatic hydrocarbons.

The emulsifier can be any of several types as long as it allows the solid UV resin and the phase change agent to form a stable emulsion. Preferably, the emulsifier is Tween T-80, but is not limited thereto.

The photoinitiator can be selected from various types of photoinitiators, as long as it absorbs energy of a certain wavelength in the ultraviolet region (250-420 nm) or the visible light region (400-800 nm). Preferably, the photoinitiator is TPO, but is not limited to thereto.

Preferably, 50%-60% of the solid UV resin, 5%-15% of the phase change agent, 1%-5% of the emulsifier, and 30%-43% of the deionized water are used in this step. More preferably, 52%-58% of the solid UV resin, 8%-12% of the phase change agent, 1%-3% of the emulsifier, and 32%-40% of the deionized water are used. The amount of the photoinitiator is 1% to 5% of the total solids. The percentage sign in this paragraph refers to weight percentage.

Figure 2:
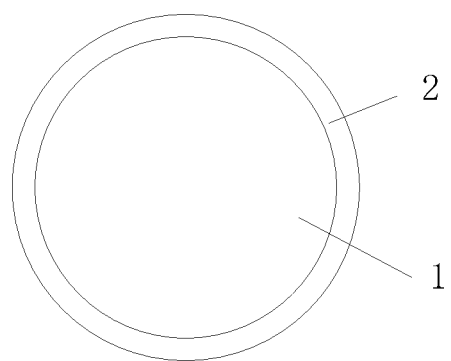
FIG. 2 is a structural diagram of the multi-phase structured UV-curable powder coating resin of the present disclosure.

The curing reactions of both liquid UV resin and solid UV resin are not affected by temperature, only affected by UV light. Following this principle, in the present disclosure, the solid UV resin is molten in the water phase; the liquid UV resin functions as the nucleus, and at least one layer of the solid UV resin is coated on the surface of the liquid UV resin through phase transition, melting, and cooling. The solid UV resin solidifies to form a shell in the first place during cooling, as the solid UV resin has a high melting point. The melting point of the liquid UV resin is low, and so it is liquid at room temperature. As a result, a multi-phase structured UV-curable powder coating resin comprising an inner liquid phase and an outer solid phase is formed. As shown in FIG. 2, the multi-phase structured UV-curable powder coating resin comprises core 1 and shell 2. Core 1 is the liquid UV resin, shell 2 is the solid UV resin, and shell 2 is coated on the periphery of core 1.

S103, Press filtering the suspension of the UV-curable powder coating resin to obtain a filter cake.

Specifically, the suspension of the UV-curable powder coating resin is filtered with a plate and frame filter to obtain the filter cake and filtrate, wherein the filtrate is collected for recycling. This contributes to environmental sustainability while also lowering production costs.

S104—drying and classifying the filter cake to obtain the multi-phase structured UV-curable powder coating resin.

The filter cake is transported to a fluidized bed dryer, wherein compressed air of the fluidized bed dryer is controlled at 25-90° C.; powder obtained after drying is classified with a cyclone to obtain the multi-phase structured UV-curable powder coating resin having a particle size of 0.8-1.5 μm.

The present disclosure also discloses a multi-phase structured UV-curable powder coating resin, comprising:

a liquid UV resin, the liquid UV resin is pre-emulsified;
a solid UV resin coated on an outer surface of the liquid UV resin;
the liquid UV resin and the solid UV resin form a shell-core structure through phase transition achieved by melting, dispersing, cooling, and coating.

The shell-core structure is shown in FIG. 2 and comprises core 1 and shell 2. Core 1 is liquid UV resin, and shell 2 is solid UV resin. Shell 2 coats the periphery of core 1. The diameter of the core is about 0.8-1.5 μm, the thickness of the shell is about 0.4-1.5 μm.

The technical details of the liquid UV resin, the solid UV resin, the emulsification of the liquid UV resin, the melting, dispersing, cooling, and coating to form the shell-core structure through phase transition are described above and hence not discussed again here.

The multi-phase structured UV-curable powder coating resin of the present disclosure contains both liquid UV resin and solid UV resin. It has the properties of both the liquid UV resin (excellent leveling and mechanical properties, the latter of which include adhesion, impact resistance, and chemical resistance) and the solid UV resin (can be pulverized into powder and can be sprayed as powder coating). As a result, the resin can be used in a wide range of applications. Furthermore, the system does not contain any diluting solvent and so is environmentally friendly.

Furthermore, the solid UV resin in the present disclosure is a crystalline unsaturated polyester resin with a low melting temperature of about 80-90° C. The liquid UV resin is a liquid at room temperature. When the multi-phase structured UV-curable powder coating resin of the present disclosure reaches 80-90° C., it is molten and can be cured by UV after leveling. The melting and curing temperatures of the powder coating resin described in the present disclosure are lower than those of existing powder coatings.

To summarize, the UV-curable powder coating resin disclosed here can be cured by UV at low temperatures. It possesses good impact and chemical resistance, as well as the ability to produce transparent/opaque coatings with exceptional properties on the substrate's surface. It is suitable for applying on heat-sensitive substrates such as solid wood furniture and rigid plastics. Therefore, it has a wide range of applications.

The present invention is further described below with reference to examples.

Example 1

(1) 60 wt % of polyurethane acrylate and 3 wt % of Tween 80 (emulsifier) were heated at 65° C. for 12 h. After the liquid UV resin and the emulsifier were completely transparent, they were added to a dispersing cylinder and dispersed with a high-speed disperser at a dispersion speed of 800 rpm. 37 wt % of deionized water was then slowly added for emulsification to generate an emulsion of the liquid UV resin. The emulsification lasted for 20 min, and the average particle size of the emulsion of the liquid UV resin was 1.0 µm.

(2) 50 wt % of a crystalline unsaturated polyester resin, 10 wt % of solid paraffin, 2 wt % of Tween 80 (emulsifier), and 38 wt % of deionized water were added into the dispersing cylinder and dispersed with a high-speed disperser at a dispersing speed of 400 rpm. Meanwhile, hot water at 95° C. was introduced into the jacket of the dispersion cylinder. The solid UV resin and the solid paraffin were entirely molten when the system temperature reached 85° C., and they were emulsified and dispersed in deionized water for 20 minutes. The crystalline unsaturated polyester resin was an unsaturated polyester resin obtained by reacting with crystalline vinyl ether oligomers.

(3) The dispersion speed of the high-speed disperser was set to 900 rpm, and hot water at 95° C. was continuously provided. During dispersion and stirring, the emulsion of the liquid UV resin was introduced. TPO (photoinitiator) was added after system temperature reached 85° C., and dispersion was continued for 30 minutes. The amount of TPO was 5 wt % of the total solids.

(4) The dispersion tank changed to the cold water system, and the hot water system was switched off. The cold water temperature was set at 20° C., and the system began to cool. The stirring and dispersing speed was kept at 900 rpm.

(5) When system temperature dropped to 35° C., the suspension was filtered with a plate and frame filter to obtain the filter cake and filtrate. The filtrate was collected for recycling.

(6) The filter cake was transported to a fluidized bed dryer, wherein compressed air of the fluidized bed dryer was controlled at 45° C. The filter cake was dried by low-temperature drying. The dried powder was classified with a cyclone to obtain the multi-phase structured UV-curable powder coating resin having an average particle size of 1.5 µm.

Example 2

(1) 55 wt % of polyurethane acrylate and 3 wt % of Tween 80 (emulsifier) were heated at 70° C. for 10 h. After the liquid UV resin and the emulsifier were completely transparent, they were added to a dispersing cylinder and dispersed with a high-speed disperser at a dispersion speed of 700 rpm. 42 wt % of deionized water was then slowly added for emulsification to generate an emulsion of the liquid UV resin. The emulsification lasted for 30 min, and the average particle size of the emulsion of the liquid UV resin was 1.2 µm.

(2) 55 wt % of a crystalline unsaturated polyester resin, 8 wt % of solid paraffin, 2 wt % of Tween 80 (emulsifier), and 35 wt % of deionized water were added into the dispersing cylinder and dispersed with a high-speed disperser at a dispersing speed of 300 rpm. Meanwhile, hot water at 100° C. was introduced into the jacket of the dispersion cylinder. The solid UV resin and the solid paraffin were entirely molten when the system temperature reached 90° C., and they were emulsified and dispersed in deionized water for 30 minutes. The crystalline unsaturated polyester resin was an unsaturated polyester resin obtained by reacting with crystalline vinyl ether oligomers.

(3) The dispersion speed of the high-speed disperser was set to 800 rpm, and hot water at 95° C. was continuously provided. During dispersion and stirring, the emulsion of the liquid UV resin was introduced. TPO (photoinitiator) was added after system temperature reached 85° C., and dispersion was continued for 30 minutes. The amount of TPO was 4 wt % of the total solids.

(4) The dispersion tank changed to the cold water system, and the hot water system was switched off. The cold water temperature was set at 20° C., and the system began to cool. The stirring and dispersing speed was kept at 800 rpm.

(5) When system temperature dropped to 35° C., the suspension was filtered with a plate and frame filter to obtain the filter cake and filtrate. The filtrate was collected for recycling.

(6) The filter cake was transported to a fluidized bed dryer, wherein compressed air of the fluidized bed dryer was controlled at 45° C. The filter cake was dried by low-temperature drying. The dried powder was classified with a cyclone to obtain the multi-phase structured UV-curable powder coating resin having an average particle size of 1.59 µm.

Example 3

(1) 70 wt % of polyurethane acrylate and 5 wt % of Tween 80 (emulsifier) were heated at 60° C. for 12 h. After the liquid UV resin and the emulsifier were completely transparent, they were added to a dispersing cylinder and dispersed with a high-speed disperser at a dispersion speed of 800 rpm. 25 wt % of deionized water was then slowly added for emulsification to generate an emulsion of the liquid UV resin. The emulsification lasted for 20 min, and the average particle size of the emulsion of the liquid UV resin was 1.4 µm.

(2) 60 wt % of a crystalline unsaturated polyester resin, 8 wt % of solid paraffin, 2 wt % of Tween 80 (emulsifier), and 30 wt % of deionized water were added into the dispersing cylinder and dispersed with a high-speed disperser at a dispersing speed of 400 rpm. Meanwhile, hot water at 105° C. was introduced into the jacket of the dispersion cylinder. The solid UV resin and the solid paraffin were entirely molten when the system temperature reached 95° C., and they were emulsified and dispersed in deionized water for 25 minutes. The crystalline unsaturated polyester resin was an unsaturated polyester resin obtained by reacting with crystalline vinyl ether oligomers.

(3) The dispersion speed of the high-speed disperser was set to 700 rpm, and hot water at 95° C. was continuously provided. During dispersion and stirring, the emulsion of the liquid UV resin was introduced. TPO (photoinitiator) was added after system temperature reached 85° C., and dispersion was continued for 30 minutes. The amount of TPO was 5 wt % of the total solids.

(4) The dispersion tank changed to the cold water system, and the hot water system was switched off. The cold water temperature was set to 20° C., and the system began to cool. The stirring and dispersing speed was kept at 700 rpm.

(5) When system temperature dropped to 35° C., the suspension was filtered with a plate and frame filter to obtain the filter cake and filtrate. The filtrate was collected for recycling.

(6) The filter cake was transported to a fluidized bed dryer, wherein compressed air of the fluidized bed dryer was controlled at 45° C. The filter cake was dried by low-temperature drying. The dried powder was classified with a cyclone to obtain the multi-phase structured UV-curable powder coating resin having an average particle size of 2.2 µm.

The UV-curable powder coating resins produced in embodiments 1-3 were prepared into powder coatings. Through spraying, heating, and UV irradiation, the powder coatings were cured to form coating films. Technical tests were performed on the coating films and the results are shown below:

| Parameters | Example 1 | Example 2 | Example 3 |
|---|---|---|---|
| Positive and negative impact strength/kg · cm | 50/50 | 50/50 | 50/50 |
| Adhesion/grade | 0 | 0 | 0 |
| Cylindrical bend test/mm | <3 | <3 | <3 |
| Acetone resistance (rubbing method)/times | >500 | >500 | >500 |
| Acetone resistance (immersion method)/h | >24 | >24 | >24 |

It should be noted that the positive and negative impact strength test of the coating film was carried out in accordance with GB/T 1732-93. The impact strength test involves dropping a 50 kg hammer from a maximum height of 50 cm to a test board, and examining the test board with a 4× magnifying glass. The results show that there were no cracks, wrinkles, or peeling in the coating films.

The adhesion test was carried out in accordance with GB/T 9286-1998. The results indicate that when aright-angle lattice pattern was cut into the coating films penetrating through to the substrate, the cutting edges were entirely smooth, and no lattice fell off. The adhesion level was 0.

The cylindrical bending test was carried out in accordance with GB/T 6742-2007. The results show that the maximum axial diameter that caused the coating films to crack and/or to peel off from the substrate was 3 mm; the coating films have good crack resistance.

Acetone resistance tests were carried out in accordance with GB/T 9274-88. The results indicate that the coating films of the present disclosure were resistant to acetone rubbing (500 times): they did not effervesce or fall off. The coating films of the present disclosure were likewise resistant to acetone soaking (24 h): they did not effervesce or fall off.

The above are the preferred embodiments of the disclosure. It should be noted that those skilled in the art can also make several improvements and refinements without departing from the principles of the invention. These improvements and refinements are considered to be within the scope of protection of the present disclosure.

What is claimed is:

1. A method for preparing a multi-phase structured UV-curable powder coating resin, comprising:
   (1) obtaining an emulsion of a liquid UV resin by heating the liquid UV resin and an emulsifier, dispersing and adding deionized water for emulsification;
   (2) melting and dispersing a solid UV resin, a phase change agent, an emulsifier, and the deionized water until fully molten and homogeneously dispersed; adding the emulsion of the liquid UV resin with stirring to thoroughly mix; temperature is lowered during the stirring to obtain a suspension of the multi-phase structured UV-curable powder coating resin;
   (3) press filtering the suspension of the UV-curable powder coating resin to obtain a filter cake;
   (4) drying and classifying the filter cake to obtain the multi-phase structured UV-curable powder coating resin.

2. The method according to claim 1, characterized in that in step (1), the liquid UV resin and the emulsifier are heated at 50-70° C.; after the liquid UV resin and the emulsifier are completely transparent, they are added to a dispersing cylinder and dispersed with a high-speed disperser at a dispersion speed of 600-900 rpm; the deionized water is slowly added for emulsification to generate the emulsion of the liquid UV resin, wherein the emulsification lasts for 20-40 min, and a particle size of the emulsion of the liquid UV resin is controlled between 0.8-1.5 µm.

3. The method according to claim 2, characterized in that 50-70 wt % of the liquid UV resin, 3-10 wt % of the emulsifier, and 25-45 wt % of the deionized water are used.

4. The method according to claim 1, characterized in that in step (2), the phase change agent is solid paraffin having a melting point of 40-95° C.

5. The method according to claim 4, characterized in that step (2) comprising:
   adding the solid UV resin, the phase change agent, the emulsifier, and the deionized water into a dispersion tank for stirring and dispersing at a dispersion speed of 200-400 rpm;
   melting and dispersing the solid UV resin, the phase change agent, the emulsifier, and the deionized water for a dispersion time of 10-30 min after raising a temperature to 80-100° C.;
   adding the emulsion of the liquid UV resin with stirring and dispersing under heating after adjusting the dispersion speed to 600-900 rpm; adding a photoinitiator and continuing to disperse for 20-40 min after the temperature reaches 80-100° C.;
   lowering the temperature to 30-40° C. during the stirring.

6. The method according to claim 5, characterized in that 50-60 wt % of the solid UV resin, 5-15 wt % of the phase change agent, 1-5 wt % of the emulsifier, and 30-43 wt % of the deionized water are used.

7. The method according to claim 1, characterized in that the liquid UV resin is at least one selected from the group consisting of polyurethane acrylate, epoxy acrylate, and polyester acrylate;
   the solid UV resin is a crystalline unsaturated polyester resin.

8. The method according to claim 7, characterized in that the solid UV resin is an unsaturated polyester resin obtained by reacting with crystalline vinyl ether oligomer.

9. The method according to claim 1, characterized in that in step (4), the filter cake is transported to a fluidized bed dryer, wherein compressed air of the fluidized bed dryer is controlled at 25-90° C.; powder obtained after drying is classified with a cyclone to obtain the multi-phase structured UV-curable powder coating resin having a particle size of 1.2-3.0 µm.

10. A multi-phase structured UV-curable powder coating resin, comprising:
    a liquid UV resin, the liquid UV resin is pre-emulsified;
    a solid UV resin coated on an outer surface of the liquid UV resin;

the liquid UV resin and the solid UV resin form a shell-core structure through phase transition achieved by melting, dispersing, cooling, and coating.

11. The multi-phase structured UV-curable powder coating resin according to claim 10, characterized in that the liquid UV resin is at least one selected from the group consisting of polyurethane acrylate, epoxy acrylate, and polyester acrylate;

the solid UV resin is a crystalline unsaturated polyester resin.

12. The multi-phase structured UV-curable powder coating resin according to claim 11, characterized in that the solid UV resin is an unsaturated polyester resin obtained by reacting with crystalline vinyl ether oligomer.

13. The multi-phase structured UV-curable powder coating resin according to claim 10, characterized in that pre-emulsification of the liquid UV resin comprising;

heating the liquid UV resin and the emulsifier at 50-70° C.; adding the liquid UV resin and the emulsifier to a dispersing cylinder after they are completely transparent; dispersing with a high-speed disperser at a dispersion speed of 600-900 rpm; slowly adding deionized water for emulsification to obtain an emulsion of the liquid UV resin, wherein the emulsification lasts for 20-40 min, and a particle size of the emulsion of the liquid UV resin is controlled at 0.8-1.5 μm;

wherein 50-70 wt % of liquid UV resin, 3-10 wt % of emulsifier, and 25-45 wt % of deionized water are used.

14. The multi-phase structured UV-curable powder coating resin according to claim 10, characterized in that a process of forming the shell-core structure through phase transition achieved by melting, dispersing, cooling, and coating, comprising:

adding the solid UV resin, a phase change agent, an emulsifier, and the deionized water into a dispersion tank for stirring and dispersing at a dispersion speed of 200-400 rpm;

melting and dispersing the solid UV resin, the phase change agent, the emulsifier, and the deionized water for a dispersion time of 10-30 min after raising a temperature to 80-100° C.;

adding an emulsion of the liquid UV resin under heating with stirring and dispersing after adjusting the dispersion speed to 600-900 rpm; adding photoinitiator and continuing to disperse for 20-40 min;

lowering the temperature to 30-40° C. during the stirring;

wherein 50-60 wt % of solid UV resin, 5-15 wt % of phase change agent, 1-5 wt % of emulsifier, and 30-43 wt % of deionized water are used;

the phase change agent is solid paraffin with a melting point of 40-95° C.

* * * * *